Dec. 29, 1936.    J. J. BLACK    2,065,919
INFLATABLE REPAIR BAG
Filed Nov. 20, 1935
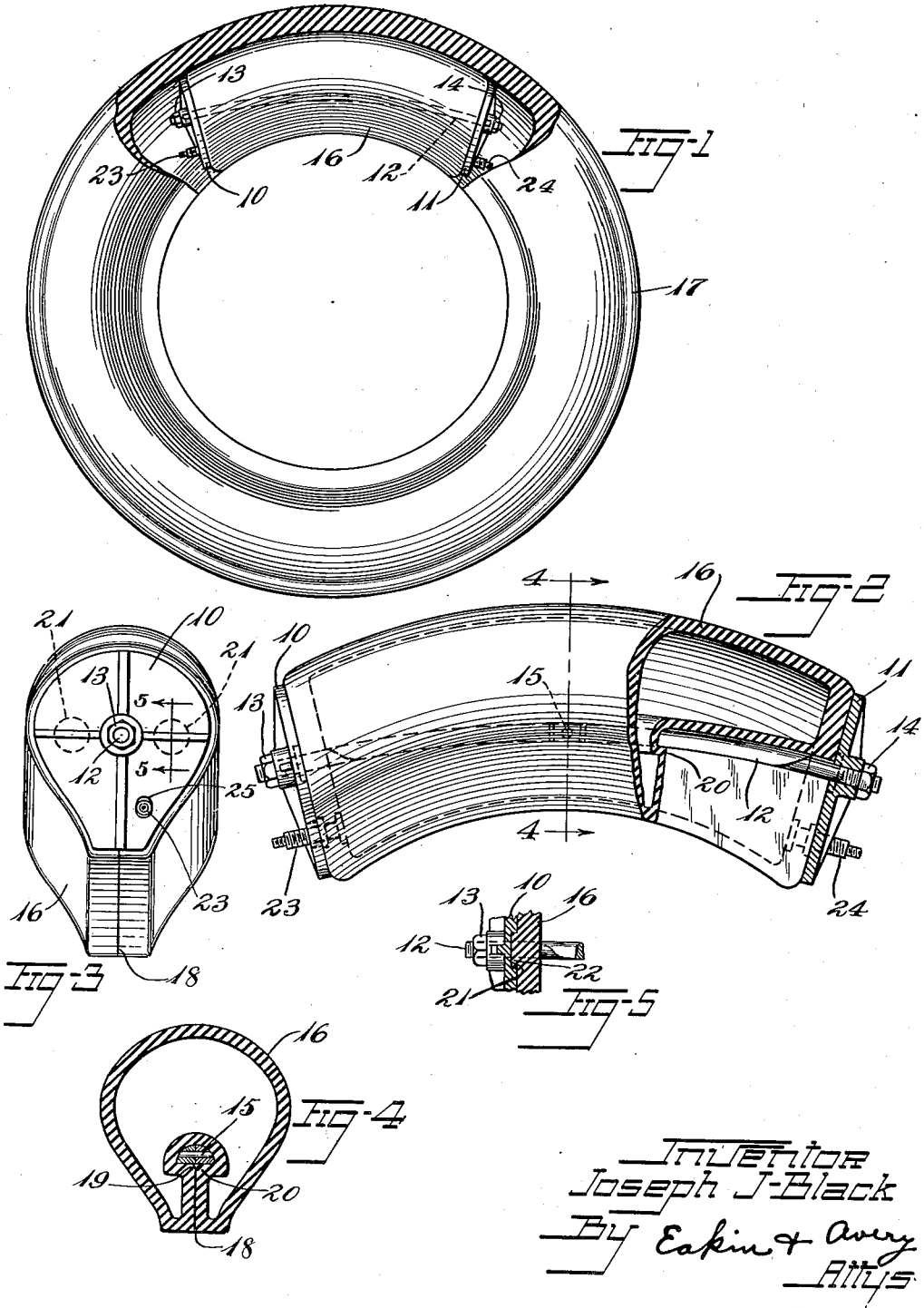
Inventor
Joseph J. Black
By Eakin & Avery
Attys.

Patented Dec. 29, 1936

2,065,919

UNITED STATES PATENT OFFICE 2,065,919

INFLATABLE REPAIR BAG

Joseph J. Black, Akron, Ohio, assignor to The B. F. Goodrich Company, New York, N. Y., a corporation of New York Application November 20, 1935, Serial No. 50,670

4 Claims. (Cl. 18—45)

This invention relates to inflatable repair bags such as are used in the repair of pneumatic tire casings.

The principal objects of the invention are to provide maximum lateral expansibility with minimum elongation, to provide facility of replacement of parts, and to provide simplicity of construction.

Other objects will appear from the following description and the accompanying drawing.

Of the drawing:

Fig. 1 is a side elevation of a pneumatic tire casing with the inflatable repair bag in place therein, the tire being broken away to show the repair bag.

Fig. 2 is a side elevation of the repair bag in its preferred form, parts of the bag being broken away and parts shown in section to more readily show the construction thereof.

Fig. 3 is an end view of the repair bag.

Fig. 4 is a cross-sectional view taken on line 4—4 of Fig. 2.

Fig. 5 is a fragmentary sectional view taken on line 5—5 of Fig. 3.

Referring to the drawing, the numerals 10 and 11 designate a pair of rigid plates, preferably of metal. Each plate is formed with a central aperture to receive the ends of a tension rod 12 and are retained thereon by nuts 13 and 14. Rod 12 is preferably formed of two parts hinged at 15 to permit the device to accommodate itself to tires of different curvature. The inflatable member 16 is a hollow bag of soft vulcanized rubber generally arcuate and of such cross-sectional shape as to conform approximately to the interior of the tire 17, to be repaired. The walls of the bag are formed to provide a reentrant slot 18 along its concave side, the slot being widened remote from its entrance to receive the rod 12, as seen in Fig. 4, and with the walls defining the slot normally in contact near its entrance, whereby the bag may be slipped over the rod 12 and between the plates 10 and 11 without disassembling those parts.

In order to more securely retain the inflatable bag in place, the rod 12, between the plates 10 and 11, is preferably formed of semi-cylindrical cross section with its flat side toward the entrance of the slot in the bag and the walls of the bag defining the slot are formed with square shoulders 19 and 20 to engage under the flat face of the rod.

To prevent relative rotation of the plates 10 and 11 and the bag, the plates are formed with recesses 21 and the bag with interlocking projections 22 to act as dowels, as shown in Fig. 5.

To provide for inflation of the bag and for circulation of steam therethrough, the bag 16, which is otherwise completely closed, is provided at its ends with one or more metallic nipples 23, 24 which are sealed thereto and pass through slots 25 formed in the end plates. The slots provide for limited radial movement of the nipples during inflation and assist in entering the nipples through the plates when placing the bag in position.

In the preferred form of the invention the absence of fabric cords or other reinforcements permits a high degree of lateral expansibility, whereas the rigid retaining plates and tension rod prevent undesired longitudinal expansion of the device. The bifurcated form of the expansible bag permits that member to be readily replaced. As the outer surface of the bag becomes hardened by continued heating, it may be removed from the rigid supporting members, the hardened surface may be buffed away, and a new surface layer of rubber may be applied thereto.

I claim:

1. An expansible curing bag comprising a pair of opposed rigid end plates, a tension member for holding said plates in spaced relation, and an expansible bag member formed with a reentrant channel adapted to straddle and surround the tension member between said end plates.

2. An expansible curing bag comprising a pair of opposed rigid end plates, a tension member for holding said plates in spaced relation, and an all-rubber expansible bag member formed with a reentrant channel adapted to straddle and surround the tension member between said end plates.

3. An expansible curing bag comprising a pair of opposed rigid end plates, a tension member for holding said plates in spaced relation, and an expansible bag member formed with a reentrant channel adapted to straddle and surround the tension member between said end plates, said end plates and said expansible bag being provided with inter-engaging means for holding those parts in engagement with each other.

4. An expansible curing bag comprising a pair of opposed rigid end plates, a tension member for holding said plates in spaced relation, and an expansible bag member formed with a longitudinal reentrant channel adapted to straddle and surround the tension member between said end plates, the walls of the bag defining the channel having shoulders for engaging the tension member to hold the bag in place.

JOSEPH J. BLACK.